Dec. 1, 1959 A. B. JACOBSEN 2,915,603
BIAS STABILIZED CASCADED TRANSISTORS
Filed Jan. 3, 1955
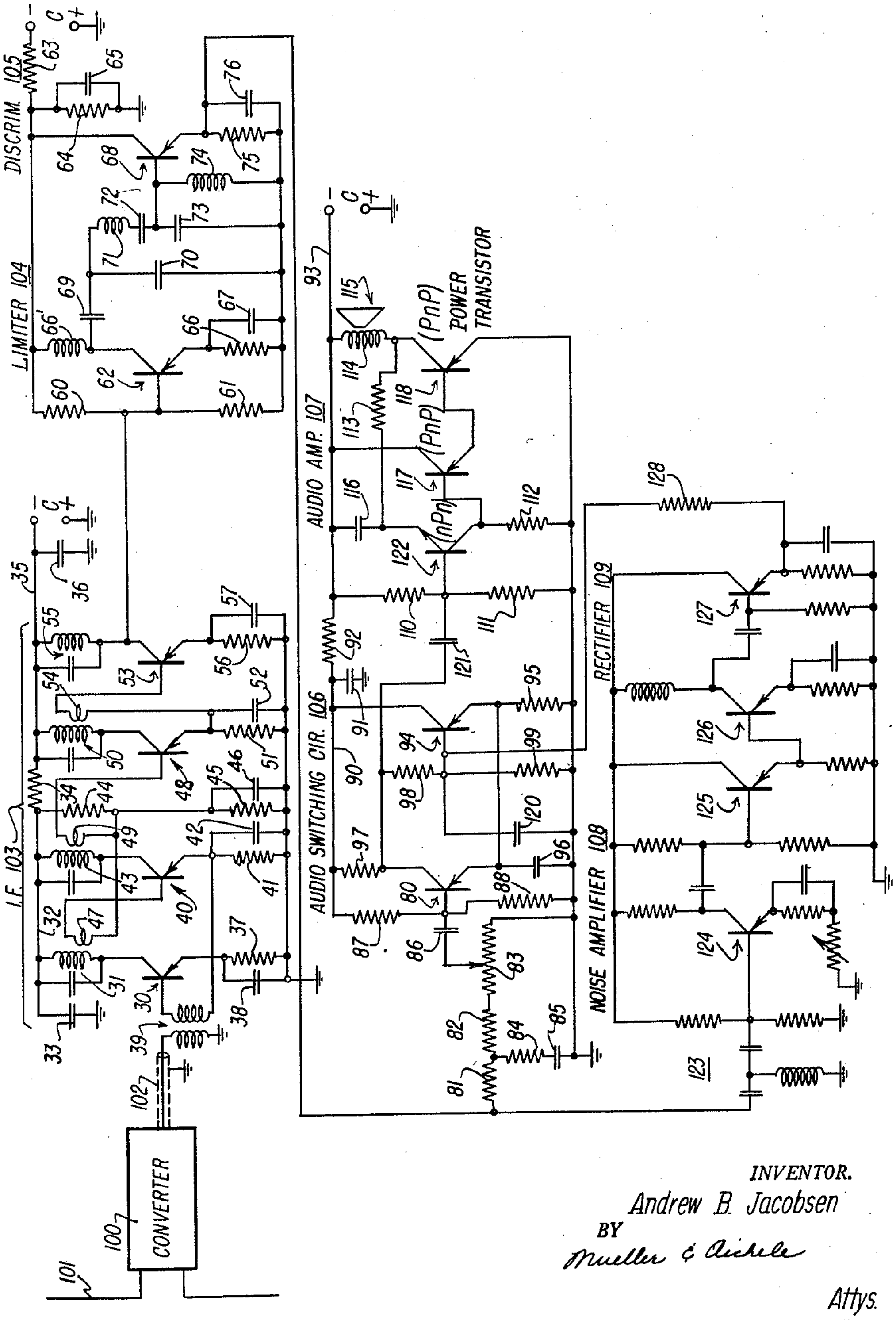
INVENTOR.
Andrew B. Jacobsen
BY
Mueller & Aichele
Attys.

United States Patent Office 2,915,603

Patented Dec. 1, 1959

2,915,603

BIAS STABILIZED CASCADED TRANSISTORS

Andrew B. Jacobsen, Phoenix, Ariz., assignor to Motorola, Inc., Chicago, Ill., a corporation of Illinois Application January 3, 1955, Serial No. 479,342

4 Claims. (Cl. 179—171)

The invention provides an improved communication receiver of the frequency modulation type, and more particularly such a receiver in which full use is made of transistors.

A disadvantage inherent in present day transistors and in their use in communication circuits, is the fact that adequate stabilization must be provided for variations in the parameters of the various transistors. These variations have been found to occur between different transistors of the same type, and also in individual transistors after they have been in use for some time.

It is an object of the present invention to provide in a communication receiver simple stabilizing circuits that render the use of transistors feasible from a performance standpoint and also from economical and commercial standpoints.

A more general object of the invention is to provide relatively simple transistor stabilizing circuits for use in a communication receiver to render such receiver efficient and stable in its operation.

A feature of the invention is the provision in a communication receiver of a stabilizing circuit including direct current connections between succeeding cascaded transistor stages for producing stabilized static bias potentials for such stages with a minimum of components and circuitry.

Another feature of the invention is the provision in such a communication receiver of a cascaded amplifier in which stabilization is achieved by the aforementioned direct current connections and in which efficient use is made of cascaded transistors of opposite conductivity types.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a communication receiver constructed in accordance with the invention.

The invention provides an electronic circuit including first and second transistors each having a base electrode, an emitter electrode and a collector electrode. Stabilizing resistance means connects a first electrode of the first transistor to a point of reference potential, and means is provided that connects a first electrode of the second transistor to this point. Means connects the second electrode of the first and second transistors to a first source of direct current biasing potential. Means is also provided for connecting the third electrode of the first transistor to a second source of a direct current bias potential of lower value than the first source, and a connection extends from the third electrode of the second transistor to the first electrode of the first transistor.

The transistorized frequency modulation communication receiver shown in the accompanying drawings includes a suitable converter 100 which is coupled to an antenna 101 and has output terminals connected through a co-axial line 102 to an intermediate frequency amplifier 103. The converter is capable of selecting and amplifying frequency-modulated wave signals intercepted by antenna 101 and of heterodyning such signals to the selected intermediate frequency of the receiver. The resulting intermediate-frequency signals are amplified in the intermediate frequency amplifier 103 and are amplitude limited in a limiter stage 104 and detected in a discriminator-detector stage 105 to recover the audio information.

The resulting audio signal is impressed through an audio switching circuit 106 and an audio amplifier 107 to the loud speaker 115 of the receiver. The receiver also includes a noise amplifier 108 which responds to the noise level in the receiver to produce signal bursts that are rectified in a rectifier 109 which develops control pulses for the audio switching circuit. With this arrangement, interchannel squelch is provided for the audio amplifier whenever the receiver is tuned from one signal to another.

The intermediate frequency amplifier section of the receiver is shown as incorporating four cascade-connected transistor stages. The first stage includes a transistor 30 having a collector electrode connected through a parallel tuned circuit 31 to a direct current bias potential bus 32. Bus 32 is by-passed to a point of reference potential or ground through a capacitor 33 and is connected through an isolating resistor 34 and direct current bias potential bus 35 to the negative terminal of unidirectional bias source C. Bus 35 is by-passed to ground through a capacitor 36 and the positive terminal of the bias source is connected to ground. The elements 33, 34 and 36 provide power supply isolation between the first two and second two stages of the intermediate frequency amplifier.

The emitter electrode of transistor 30 is connected through a stabilizing resistor 37 to ground, this resistor being shunted by a by-pass capacitor 38. The base electrode of transistor 30 is connected through the secondary winding of coupling transformer 39 to the emitter electrode of the transistor 40 of the succeeding stage. This latter emitter electrode is connected to ground through a stabilizing resistor 41 which is shunted by a capacitor 42. The collector electrode of transistor 40 is connected through a parallel resonant tuned circuit 43 to the bus 32. Bus 32 is connected to ground through a pair of resistors 44 and 45 which form a voltage divider, resistor 45 being shunted by a by-passing capacitor 46.

The base electrode of transistor 40 is connected through an inductive winding 47 to the common junction of resistors 44 and 45, winding 47 being inductively coupled to the resonant network 31.

The third intermediate frequency amplifier stage includes a transistor 48 whose base electrode is connected through an inductive winding 49 to the common junction of resistors 44 and 45, with winding 49 being inductively coupled to the resonant network 43. The collector electrode of transistor 48 is connected through a resonant network 50 to the bus 35, and the emitter electrode of this transistor is connected to ground through a resistor 51 which is shunted by a capacitor 52.

The final intermediate frequency amplifier stage includes a transistor 53 whose base electrode is connected to the emitter electrode of transistor 48 through an inductive winding 54 which is inductively coupled to the resonant network 50. The collector electrode of transistor 53 is connected through a resonant parallel tuned network 55 to the bus 35, and the emitter electrode is connected through a stabilizing resistor 56 to ground, which resistor is shunted by a by-passing capacitor 57.

The intermediate frequency amplifier stages function as the grounded emitter type for the intermediate frequency signal. Resonant networks 31, 43, 50 and 55 are all tuned to the intermediate frequency, and in each instance the amplified intermediate frequency signal appears across the respective ones of these networks to be fed to the succeeding stage by the respective inductively coupled windings 47, 49 and 54.

The stages including transistors 40 and 48 are biased by means of a stabilizing circuit that is similar to the one disclosed and claimed in copending application Serial No. 340,105, filed March 3, 1953 in the name of Robert P. Crow and assigned to the present assignee. It is assumed, for purposes of the present discussion, that the transistors 30, 40, 48 and 53 are of the P-N-P type. A suitable negative bias is supplied to the collector electrode of transistor 40 from bus 32 and through the tuned network 43. A lower bias potential is supplied to the base electrode of this transistor 40 from the tap on the voltage divider 44, 45 and through winding 47. This latter bias potential has sufficient value to produce a current flow in transistor 40 between the base and emitter electrodes so that a bias potential is established across stabilizing resistor 41 to provide the proper bias between the base and emitter electrodes for satisfactory operation. As fully described in the copending application, any tendency for the current across the emitter junction to vary due to temperature changes and the like, has no material effect on the circuit due to the resulting stabilizing change in bias across the stabilizing resistor 41 in response to such current changes.

The collector electrode of transistor 48 is returned to bus 35 through tuned circuit 50, and its base electrode is connected through winding 49 to the junction of resistors 44 and 45. This junction is established at alternating-current ground by capacitor 46 so that transistor 48 may also obtain a direct current bias potential therefrom without A.C. interference. Stabilizing resistor 51 is given an appropirate value to establish the desired bias on the emitter junction of transistor 48 so that it is stabilized in much the same manner as transistor 40.

Due to the amplification that is realized in the amplifier, it is infeasible to return subsequent stages to the junction of resistors 44 and 45 for biasing purposes, this being due to the difficulty in providing sufficient by-passing capacity by capacitor 46 to prevent feedback to the preceding stages. For that reason, it would normally be necessary to use an additional voltage divider such as divider 44, 45 for transistor 53. However, in accordance with the present invention, the base electrode of transistor 53 is returned to the emitter electrode of transistor 48. This provides a satisfactory direct current bias potential to transistor 53, and which potential is stabilized by resistor 56. Moreover, variations in the potential across resistor 51 due to variations in the parameters of transistor 48 produce a compensation in transistor 53 for such variations so that an effective added compensation is realized in the circuit.

The same technique is used for providing a bias to the base electrode of the first stage transistor 30. In this instance, the base is returned to the emitter electrode of transistor 40 to derive an appropriate bias potential therefrom, which bias is stabilized by the action of resistor 37. In each instance, the stabilizing resistors 37, 41, 51 and 56 are by-passed for intermediate frequency signals by respective capacitors 38, 42, 52 and 57 so that undue degeneration in the stages is prevented. In this manner, direct current bias is provided to all the cascaded stages in the intermediate frequency amplifier by means of an exceedingly simple stabilizing circuit.

The collector electrode of transistor 53 is connected to the common junction of a pair of resistors 60 and 61, as is the base electrode of the transistor 62 in the amplitude limiter stage 104 of the receiver. Resistors 60 and 61 are connected between ground and the common junction of a pair of resistors 63 and 64; the latter being connected across a biasing potential source C, and resistor 64 being shunted by a capacitor 65 which by-passes this resistor for intermediate frequency alternating currents. The emitter electrode of transistor 62 is connected to ground through a stabilizing resistor 66 which is shunted by a capacitor 67, and the collector electrode is connected to the junction of resistors 63 and 64 through a choke coil 66[1]. The illustrated limiter circuit is one of the saturation type which functions in known manner to provide amplitude limiting to signals translated thereby.

The collector electrode of transistor 62 is coupled to the discriminator detector circuit 105 of the receiver which includes a transistor 68. Specifically, the collector electrode of transistor 62 is coupled through a capacitor 69 to one side of a network which includes a capacitor 70 shunted by an inductance coil 71 and a pair of capacitors 72 and 73. The other side of this network is connected to ground, and the common junction of capacitors 72 and 73 is connected to the base electrode of transistor 68, with capacitor 73 being shunted by an inductance coil 74.

As in the intermediate frequency amplifier, the base electrode of transistor 62 is supplied with a lower direct current bias potential than the collector by the voltage divider action of resistors 60 and 61. The direct current bias on the base electrode produces a current flow with a resulting bias on the emitter due to the potential drop across stabilizing resistor 66. The signal impressed on the circuit of transistor 62 is amplitude limited thereby and supplied to the discriminator detector circuit 105. The latter circuit is of the slope detector type using transistor 68 connected as an emitter follower in conjunction with the resonant discriminator network 69—74.

The collector electrode of transistor 68 is connected to the common junction of resistors 63 and 64, and the emitter electrode is connected to ground through a stabilizing resistor 75 which is shunted by a capacitor 76 which by-passes the resistor for alternating currents. The emitter electrode of transistor 68 is connected to the base electrode of a transistor 80 in the audio switching circuit through an input circuit including resistors 81, 82 and 83 connected between the emitter of transistor 68 and ground, with the common junction of resistors 81 and 82 being connected to ground through a resistor 84 and capacitor 85. Resistor 83 has a variable arm which is connected through a capacitor 86 to the base electrode of transistor 80.

The base electrode is connected to an intermediate point on a voltage divider 87, 88 which is connected between the D.C. bias potential bus 90 and ground. Bus 90 is by-passed to ground for alternating currents through a capacitor 91 and is connected through a resistor 92 and bus 93 to the negative terminal of the D.C. bias source C, the positive terminal of which source is connected to ground.

The audio switching circuit includes a second transistor 94, and the emitter electrode of transistor 80 and the emitter electrode of transistor 94 are connected to ground through a common resistor 95 shunted by a capacitor 96. The collector electrode of transistor 80 is connected to the bus 90 through a resistor 97, and this electrode is connected to ground through a pair of resistors 98 and 99, with resistor 99 being by-passed for audio frequencies by a capacitor 120. The collector electrode of transistor 94 is directly connected to the positive bus 90, and the collector electrode of transistor 80 is coupled through a coupling capacitor 121 to the base electrode of transistor 122 in the audio amplifier.

The emitter electrode of transistor 68 is also coupled through a coupling network 123 to the base electrode of transistor 124. Transistors 124, 125 and 126 are included in the noise amplifier, with transistor 126 being coupled to a transistor 127 in the rectifier or detector circuit 109. The emitter electrode of transistor 127 is connected through a resistor 128 to the base electrode of transistor 94 in the audio switching circuit.

The rise in noise level between received signals in the receiver causes rectifier 109 to produce a pulse which continues until a carrier of sufficient amplitude to produce limiting action in limiter 104 is received. This pulse triggers the circuit of transistors 80 and 94 so that transistor 80 is non-conductive, thus providing squelch action.

During normal operation of the receiver wherein transistor 80 is on and transistor 94 is off, transistor 80 provides a constant audio gain for the audio input signal which is supplied to the audio amplifier transistor 122. However, when the receiver is being tuned and no carrier is received, the D.C. pulse from rectifier 109 triggers the circuit and turns transistor 94 on and transistor 80 off, this being due to the common emitter resistor 95. Thus, no audio signal is supplied to the amplifier 107 so long as this condition persists. Resistor 95 also acts as a stabilizing resistor for whichever of the two transistors 80 or 94 is turned on, this action being much the same as that described in the aforementioned Crow application. Resistor 97 constitutes the load resistor for transistor 80 across which the audio output signal appears, and this resistor also functions as a D.C. stabilizing resistance in the collector circuit of this transistor. Resistors 98 and 99, in conjunction with resistor 97, provide a D.C. bias for the base electrode of transistor 94, and also complete a regenerative feedback path between the transistors which assists in the triggering action. Capacitor 120 provides an audio by-pass so that excessive audio peaks will not cause switching to take place between the transistors 80 and 94. Capacitor 96 provides an audio by-pass for resistor 95 and also determines the switching time constant. That is, after the termination of a pulse from a rectifier 109, the charge on capacitor 120 dissipates through resistor 99, reducing the bias on the emitter of transistor 80 so that the transistor begins to conduct. This causes transistor 94 to tend towards a non-conductive state through the action of network 97, 98 and 99, and gives rise to a snap action by which transistor 80 becomes conductive and transistor 94 non-conductive.

A pair of resistors 110 and 111 is connected between bus 93 and ground, and the base of audio amplifier transistor 122 is returned to the common junction of these resistors. The transistor 122 is, for example, of the NPN type and has its collector electrode connected to ground through a resistor 112, and its emitter electrode is connected to the bus 93 through a resistor 113 and through the inductance winding or coil 114 of an electromagnetic transducer or speaker 115, resistor 113 and coil 114 being shunted by a capacitor 116.

The collector electrode of transistor 122 is connected to the base electrode of a PNP transistor 117, the collector electrode of which is connected to bus 93 and whose emitter electrode is connected to the base electrode of a PNP power amplifier transistor 118. The collector electrode of transistor 118 is connected to the junction of resistor 113 and winding 114, and the emitter electrode of this transistor connected to ground.

The D.C. bias voltage for the base electrode of transistor 122 is provided by the potential divider 110, 111. Resistor 112 constitutes a load impedance for the collector electrode of transistor 122, and this electrode is directly connected to the base electrode of transistor 117 which operates as a grounded collector amplifier. The emitter electrode of transistor 117 is directly connected to the base electrode of transistor 118 which functions as a grounded emitter power amplifier. The audio output signal appearing in the collector circuit of transistor 118 appears in the winding 114 of speaker 115.

Bias stabilization is provided by resistor 112. Any variation in the average current through transistor 118, and which also flows through the coil 114 of speaker 115, causes the resulting potential variation across the coil to be impressed through resistor 113 on the emitter electrode of transistor 122. Because of this, any tendency for variations in the parameters of any of the transistors 122, 117 or 118, causes the D.C. current through transistor 118 to vary and this causes a compensating bias to be impressed on the emitter of transistor 122. Thus, stabilization is achieved.

A disclosed audio amplifier 107 is advantageous since it provides a high degree of static stabilization and can operate a loud speaker without an output transformer and may be used advantageously on low collector supply potentials. An important advantage of the circuit is the fact there is a minimum of supply potential lost in accomplishing static stabilization. In fact, this is provided by the unavoidable average voltage drop across the voice coil 114, which drop is used advantageously in the present circuit for stabilization. Capacitor 116 provides low impedance by-pass to the emitter of transistor 122 for audio frequencies so as to render the feedback path insensitive to these frequencies.

The invention provides, therefore, an improved transistorized communication receiver in which full use is made of efficient and simplified stabilizing circuits for the various transistor stages.

I claim:

1. An electronic circuit including first and second transistors each having a base electrode, an emitter electrode, and a collector electrode input circuit means for applying signals to said base electrode of said first transistor, stabilizing resistance means connecting said emitter electrode of said first transistor to a point of reference potential, shunt capacitor means by-passing said stabilizing resistance means for signal currents, means connecting said emitter electrode of said second transistor to said point of reference potential, resonant output means for connecting said collector electrodes of said first and second transistors to first direct current bias potential means, means for connecting said base electrode of said first transistor to second direct current bias potential means providing a potential of lower value than said first potential means, a circuit extending from said emitter electrode of said first transistor to said base electrode of said second transistor for applying direct current bias potential to said base electrode of said second transistor, said circuit including a coil connected in series therein coupled to said resonant output means connected to said first transistor for applying signal currents from said collector electrode of said first transistor to said base electrode of said second transistor, and output circuit means coupled to said collector electrode of said second transistor.

2. An electronic circuit including first and second transistors each having a base electrode, an emitter electrode, and a collector electrode, stabilizing resistance means connecting said emitter electrode of said first transistor to a point of reference potential, shunt capacitor means by-passing said stabilizing resistance means for signal currents, means connecting said emitter electrode of said second transistor to said point of reference potential, first and second tuned output means including inductive signal windings for connecting said collector electrodes of said first and second transistors respectively to a first direct current bias potential supply, bias means for providing a second direct current bias potential of lower value than said first potential supply, a first signal circuit including an inductive signal winding connected in series from said bias means to said base electrode of said first transistor for applying signals and a direct current bias potential to said base electrode, a second signal circuit including an inductive signal winding connected in series from said emitter electrode of said first transistor to said base electrode of said second transistor for applying signals and a direct current bias potential from said emitter electrode to said base electrode, input signal means applying signals to said inductive signal winding of one of said first and second signal circuits for applying input signals to the one of said transistors having its base electrode connected thereto, said inductive signal winding of the other of said signal circuits being coupled to the inductive signal winding of said tuned output means connected to said one transistor for applying signals therefrom to the base electrode of the other of said transistors which is connected thereto, and output means coupled to the tuned output means connected to said other transistor.

3. An electronic circuit including first and second transistors each having a base electrode, an emitter electrode and a collector electrode; stabilizing resistance means connecting said emitter electrode of said first transistor to a point of reference potential; first and second resonant circuits individually connecting said collector electrodes of said first and second transistors to a source of direct current bias potential, said first resonant circuit including inductor means, potential divider means connected across said source of direct current bias potential, a first circuit including signal input means connected in series from an intermediate point on said potential divider means to said base electrode of said first transistor for applying signals and a bias potential thereto, a second circuit including an inductive winding coupled to said inductor means of said first resonant circuit of said first transistor and connected in series from said emitter electrode of said first transistor to said base electrode of said second transistor for applying signals and a bias potential thereto, and output means coupled to said second resonant circuit.

4. An electronic circuit including first and second transistors each having a base electrode, an emitter electrode and a collector electrode; first and second stabiliz- resistance means individually connecting said emitter electrodes of said first and second transistors to a point of reference potential; first and second resonant circuits individually connecting said collector electrodes of said first and second transistors to a source of direct current bias potential, said first resonant circuit including inductor means, potential divider means connected across said source of direct current bias potential, a first input circuit including signal input means connected in series from said emitter electrode of said second transistor to said base electrode of said first transistor for applying signals and a bias potential thereto, a second input circuit including an inductive winding coupled to said inductor means of said first resonant output circuit of said first transistor and connected in series from an intermediate point on said potential divider means to said base electrode of said second transistor for applying signals and a bias voltage to said second transistor, and output means coupled to said second resonant output circuit means.

References Cited in the file of this patent

UNITED STATES PATENTS

| | | |
|---|---|---|
| 2,760,007 | Lozier | Aug. 21, 1956 |
| 2,789,164 | Stanley | Apr. 16, 1957 |
| 2,802,067 | Zawels | Aug. 6, 1957 |

OTHER REFERENCES

Shea text: "Principles of Transistor Circuits," pages 108–114, 164–176, 236, 237, published by John Wiley Sons, New York City.

Sulzer: "Junction . . . Applications," Electronics, Aug. 1953, pages 170–173.

Riddle: "Practical . . . Amplifiers," Electronics, April 1954, pages 169–171.

Stern et al.: "Transistor . . . Receivers," Electrical Engineering, December 1954, pages 1107–1112.